United States Patent
Benjamin et al.

(10) Patent No.: US 11,660,640 B2
(45) Date of Patent: May 30, 2023

(54) SEPARATION OF GRANULAR PARTICLES (71) Applicant: Gulf Conveyor Systems Pty Ltd, Wahroonga (AU)

(72) Inventors: Colin Benjamin, Wahroonga (AU); Branko Poznic, Wahroonga (AU)

(73) Assignee: GULF CONVEYOR SYSTEM S PTY LTD, Wahroonga (AU)

( * ) Notice: Subject to any disclaimer, the term of this patent is extended or adjusted under 35 U.S.C. 154(b) by 0 days.

(21) Appl. No.: 17/260,723

(22) PCT Filed: Jul. 17, 2019

(86) PCT No.: PCT/AU2019/050751
§ 371 (c)(1),
(2) Date: Jan. 15, 2021

(87) PCT Pub. No.: WO2020/014744
PCT Pub. Date: Jan. 23, 2020

(65) Prior Publication Data
US 2021/0268547 A1 Sep. 2, 2021

(30) Foreign Application Priority Data

Jul. 17, 2018 (AU) ................................ 2018902581
May 10, 2019 (AU) ................................ 2019901603

(51) Int. Cl.
*B07B 13/05* (2006.01)
*B65G 11/20* (2006.01)
(Continued)

(52) U.S. Cl.
CPC .............. *B07B 15/00* (2013.01); *B07B 4/025* (2013.01); *B07B 7/01* (2013.01); *B07B 7/04* (2013.01);
(Continued)

(58) Field of Classification Search
CPC ... B07B 13/05; B65G 11/206; B65G 2812/03; B65G 47/42; B65G 47/46
See application file for complete search history.

(56) References Cited

U.S. PATENT DOCUMENTS

| 3,904,517 A | 9/1975 | Wilson |
| 5,080,235 A | 1/1992 | Nicholas et al. |

(Continued)

FOREIGN PATENT DOCUMENTS

| CN | 104741318 A | 7/2015 |
| EP | 0482683 B1 | 7/1994 |

OTHER PUBLICATIONS

English translation of CN-104741318-A (Year: 2015).*
(Continued)

*Primary Examiner* — Howard J Sanders
*Assistant Examiner* — Jessica L Burkman
(74) *Attorney, Agent, or Firm* — Dennemeyer & Associates LLC (57) ABSTRACT

A system and method for separating granular particles according to particle size, and more particularly enhance ore grades by removing unwanted material. The system (10) comprises means (11) for transporting granular material (12) comprising multiple sized fractions with gradation of the particles according to particle size between relatively fine fractions and relatively coarse fractions, in a direction having a horizontal component; and subjecting the granular material (12) to vibration while being so transported to induce some separation of particles according to particle size. The system (10) further comprises means (13) for causing the granular material (12) to subsequently move as a granular flow (14) along a curved path (15) under the influence of gravity to further induce separation of particles according to particle size. The system (10) still further comprises means (16) for dividing the granular flow (14)
(Continued)

moving along the curved path (15) into different streams (17) according to their trajectory.

44 Claims, 5 Drawing Sheets

(51) Int. Cl.
    *B65G 47/42*     (2006.01)
    *B65G 47/46*     (2006.01)
    *B07B 15/00*     (2006.01)
    *B07B 4/02*     (2006.01)
    *B07B 7/01*     (2006.01)
    *B07B 7/04*     (2006.01)
    *B07B 13/00*     (2006.01)
    *B07B 13/04*     (2006.01)
    *B07B 13/11*     (2006.01)
    *B07B 13/16*     (2006.01)
(52) U.S. Cl.
    CPC ............ *B07B 13/003* (2013.01); *B07B 13/04* (2013.01); *B07B 13/05* (2013.01); *B07B 13/113* (2013.01); *B07B 13/116* (2013.01); *B07B 13/16* (2013.01); *B65G 11/206* (2013.01); *B65G 47/42* (2013.01); *B65G 47/46* (2013.01); *B65G 2812/03* (2013.01)

(56) References Cited

U.S. PATENT DOCUMENTS 10,752,444 B2 *   8/2020   Gray .................... B65G 11/206
2006/0070932 A1 *   4/2006   Gisquiere ............ B07B 13/113
                                                                                                209/631

OTHER PUBLICATIONS

English translation of EP-0482683-B1 (Year: 1994).*
International Search Report issued by the Australian Patent Office in connection with PCT Application No. PCT/AU2019/050751 dated Sep. 17, 2019.

* cited by examiner

SEPARATION OF GRANULAR PARTICLES

CROSS-REFERENCE TO RELATED APPLICATIONS

This is a 35 U.S.C. 371 National Stage Patent Application of International Application No. PCT/AU2019/050751, filed Jul. 17, 2019, which claims priority to Australian application 2019902581, filed Jul. 17, 2018 and Australian application 2019901603, filed May 10, 2019, each of which is hereby incorporated by reference in its entirety.

TECHNICAL FIELD

The present invention relates to a method and system for separating granular particles according to size. The invention is particularly suitable for enhancing ore grades by removing unwanted material.

BACKGROUND ART

The following discussion of the background art is intended to facilitate an understanding of the present invention only. The discussion is not an acknowledgement or admission that any of the material referred to is or was part of the common general knowledge as at the priority date of the application.

In the minerals processing industry, there is increasing reliance on lower grade ores and these ores, if processed conventionally, have very high capital cost and high operating costs (as it is necessary to also crush and process a lot of material that is waste material).

This invention seeks to take advantage of the flow characteristics of granular material along with characteristics of the ores themselves. Not all ores will be suitable to these techniques. The ore types believed to be suitable may, however, be characterised as: (i) bulk ores, such as iron ore; and (ii) ores that are recovered from host rocks where they occur as veins of mineralisation, such as copper ores.

Bulk ores such as iron ore have a characteristic of being typically harder, making such ores suitable for this type of processing. When subject to crushing, such ores do not break down as easily into smaller particles whereas the impurities, which are usually softer, readily break down. The consequence is that after initial blasting and then subject to primary crushing, there is a higher proportion of the iron ore being sought in the coarser material. While only a generalisation and by way of example, original ore grade in a bulk sample is say 54% iron. After blasting and primary crushing, about 20% of the material could be under 2 mm in diameter. This sector of the material could have an iron ore grade of only about 20% as against the initial average. By removing this material selectively, the remaining ore grade is increased to about 62.5%.

Similarly, with ores that occur as veins in a host rock, the bulk grade may for example be as low as about 0.5% copper. When crushed, the crystallised mineralisation is much more likely to break down into smaller particles than the host rock. Therefore, conversely to the above, if after initial blasting and primary crushing, all material of a material size under, say, 10 mm, is collected, a very high percentage of the target mineralisation being sought would be captured, thereby providing a significant cost saving by not further processing the residual material. As an alternative, the residual material could be subject to further analysis and material that still contains workable grades of mineralisation could be subject to further crushing. The logic remains the same, selectively removing lower grade and host rock material in such a manner as the loss of mineralised material is more that offset by the enormous savings in processing costs (both capital and operating).

It is against this background that the present invention was developed.

SUMMARY OF INVENTION

Broadly, the present invention is characterised by utilisation of a phenomenon that, in a very controlled flow environment, relatively finer particles in a given flow mass will underflow relatively coarser materials, providing flow separation. This flow separation is created by the smaller particles having a greater surface area for a given mass and as a consequence are subject to higher surface interactional forces that can loosely be described as surface frictional forces.

It is a feature of the invention that an environment is created in which there is a natural separation of granular material between relatively finer particles and relatively coarser particles. This may be achieved by a creating a flow of the granular material and controlling the flow such that separation of particles occurs without being disturbed by turbulence which would otherwise cause remixing of the separated particles.

It should be appreciated that the separation of particles within the granular flow is not likely to be a precise gradation but rather a generally broad gradation, with some comingling of particles between the relatively fine fractions and relatively coarse fractions.

According to a first aspect of the invention there is provided a method for separating granular particles comprising multiple sized fractions according to particle size, said granular particles being derived from bulk granular solids, bulk ores or ores recovered from host rocks where they occur as veins of mineralisation, said bulk granular solids, bulk ores or recovered ores having been subjected to initial conditioning by primary crushing said method comprising:

transporting granular material with gradation of the particles between relatively fine fractions and relatively coarse fractions in a direction having a horizontal component and subjecting said granular material to vibration while being so transported to induce some separation of particles according to particle size with at least a portion of said relatively fine fractions underflowing said relatively coarse fractions;

causing said granular material to move as a granular flow outwardly and downwardly, along a curved path through the air under the influence of gravity to further induce separation of particles according to particle size dividing said granular flow moving along said curved path into at least two parts according to the trajectory of constituent particles, and presenting at least one of said two parts to a surface to flow downwardly along said surface under the influence of gravity, said surface being configured to allow the flow of said one of said two parts to spread laterally across the width of said surface, with particles in said one of said two parts travelling at different speeds according to particle size such that relatively coarser particles overflow relatively finer particles, thereby facilitating further gradation between relatively fine fractions and relatively coarse fractions, said surface being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface, whereby to induce separation of said granular particles according to particle size The adopted stall angle may be selected to be the stall angle of constituent particles of said one of said two parts.

The flow according to this aspect of the invention may be controlled such that separation of particles occurs without being disturbed by turbulence which could otherwise cause remixing of the separated particles.

Preferably, the granular flow is controlled in the sense that there is no interference to material flow and no consolidation of the flow such that separated particles might remix.

The granular material may be transported by being moved along a transport path in a generally horizontal direction. The granular material may leave the transport path to create the granular flow moving along the curved path. The transport path may be inclined at or adjacent a location immediately prior to creation of the granular flow moving along the curved path. The transport path may be so inclined in an upward direction.

The granular material may be transported by a conveyor providing the transport path. More particularly, the granular material may be transported on a belt conveyor, with a run of the belt conveyor providing the transport path.

On the conveyor belt, relatively finer particles will tend to fall between the relatively coarser particles under the influence of agitation created by movement of the conveyor belt, thereby inducing some separation of particles according to particle size. The agitation created by movement of the conveyor belt in effect subjects the granular material being transported to vibration.

The belt conveyor may have a discharge end from which granular material is propelled to move through the air in a curved trajectory, thereby creating said granular flow to further induce separation of particles according to particle size. In other words, the granular flow is created by discharging granular material from a belt conveyor to cause the discharging granular material to flow through the air as a flow mass having a curved trajectory.

The run of the belt conveyor providing the transport path may be upwardly inclined at discharge end. This arrangement may enhance creation of the curved trajectory in the granular material being discharged from the belt conveyor.

While moving along the curved path, the granular flow may be subjected to a treatment to remove certain components before being divided into at least two parts according to their trajectory. The treatment may be for the purpose of removing oversize particles. The treatment may, for example, involve intercepting the granular flow with spaced bars configured to deflect larger (oversize) particles and remove them from the flow, and to allow relatively smaller particles to pass between the bars and continue in the flow.

In one arrangement, the granular flow may be divided into two parts, one part having a lower trajectory than the other.

The granular flow may be divided into at least two parts by intercepting the flow and causing it to separate into different streams of granular particles.

The granular flow may be intercepted to cause it to separate into different streams of granular particles by splitting the flow mass.

The flow mass may be caused to undergo splitting by positioning of a splitter in the path of the flow. The arrangement may be such that a portion of the granular flow is caused to pass over the splitter and a portion of the granular flow is caused to pass under the splitter system. In other words, the splitter separates the granular flow into two streams, one of which overflows the splitter and the other of which underflows the splitter.

One or more of the different streams of granular particles may each be subjected to further treatment (such as separation), although this need not necessarily be so.

One or more of the different streams of granular particles may each be presented to a surface to flow downwardly along the surface under the influence of gravity. The surface may be configured to allow the flow to spread laterally across the width of the surface, with particles travelling at different speeds according to particle size such that relatively coarser particles overflow relatively finer particles, thereby facilitating further gradation between relatively fine fractions and relatively coarse fractions.

The angle at which the surface intercepts the stream of granular particles is preferably selected to achieve flow downwardly across the surface as a sliding flow under the influence of gravity with little or no impact on the surface.

The surface may be inclined at an angle just above a stall angle for the granular material (as described in WO 2014/026248, the content of which are incorporated herein by way of reference). Typically, the inclination of the surface would be in the range of about 65 to 45 degrees from horizontal, dependent of course on the water content in the granular material. The surface may be defined by an inclined plate.

The further gradation may present the stream of granular particles for screening, with smaller fractions generally below larger fractions in the graduated stream of granular particles.

Presenting granular material for screening with smaller fractions generally below larger fraction facilitates the screening process. For instance, gradation of granular particles between relatively fine fractions and relatively coarse fractions may potentially enhance screening effectiveness and/or screening efficiency.

According another aspect of the invention there is provided a system for separating granular particles according to particle size, said granular particles being derived from bulk granular solids, bulk ores or ores recovered from host rocks where they occur as veins of mineralisation, said bulk granular solids, bulk ores or recovered ores having been subjected to initial conditioning by primary crushing and said system comprising:

a conveyor for transporting granular material comprising multiple sized fractions with gradation of particles in said granular material according to particle size between relatively fine fractions and relatively coarse fractions in a direction having a horizontal component and subjecting said granular material to vibration while being so transported to induce some separation of particles according to particle size, with a portion of said relatively fine fractions underflowing said relatively coarse fractions, said conveyor causing said granular material to subsequently move as a granular flow outwardly and downwardly along a curved path through the air under the influence of gravity to further induce separation of particles according to particle size;

a separator for dividing said granular flow moving along the curved path into at least two parts according to the trajectory of constituent particles, and a surface plate presenting a surface to at least one of said two parts to flow downwardly along said surface plate under the influence of gravity, said surface plate being configured to allow the flow of said one of said two parts to spread laterally across the width of said surface plate, with particles travelling at different speeds according to particle size such that relatively coarser particles overflow relatively finer particles, thereby facilitating further gradation between relatively fine fractions and relatively coarse fractions, said surface plate being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface plate, whereby to induce separation of said granular particles according to particle size.

The flow according to this aspect of the invention may be controlled such that separation of particles occurs without being disturbed by turbulence which could otherwise cause remixing of the separated particles.

The adopted stall angle according to this aspect of the invention may be selected to be the stall angle of constituent particles of said one of said two parts.

According to a further aspect of the invention there is provided a method for enhancing ore grades by removing unwanted material from bulk granular solids, bulk ores or ores recovered from host rocks where they occur as veins of mineralisation, said bulk granular solids, bulk ores or recovered ores having been subjected to initial conditioning by primary crushing said method comprising:

transporting said crushed ore with gradation of particles of said crushed ore between relatively fine fractions and relatively coarse fractions in a direction having a horizontal component and subjecting said crushed ore to vibration while being so transported to induce some separation of particles according to particle size;

causing said crushed ore to move as a granular flow outwardly and downwardly along a curved path through the air under the influence of gravity to further induce separation of particles according to particle size with at least a portion of said relatively fine fractions underflowing said relatively coarse fractions;

dividing said granular flow moving along the curved path into at least two parts according to the trajectory of constituent particles, and presenting at least one of said two parts to a surface to flow downwardly along said surface under the influence of gravity, said surface being configured to allow the flow of said one of said two parts to spread laterally across the width of said surface, with particles in said one of said two parts travelling at different speeds according to particle size such that relatively coarser particles overflow relatively finer particles, thereby facilitating further gradation between relatively fine fractions and relatively coarse fractions, said surface being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface, whereby to induce separation of said granular particles according to particle size and removing unwanted material.

The flow according to this aspect of the invention may be controlled such that separation of particles occurs without being disturbed by turbulence which could otherwise cause remixing of the separated particles.

The adopted stall angle according to this aspect of the invention may be selected to be the stall angle of constituent particles of said one of said two parts.

One of the parts may comprise unwanted material or such part may be subjected to further separation to remove unwanted material.

According to a further aspect of the invention there is provided a system for enhancing ore grades by removing unwanted material from bulk granular solids, bulk ores or ores recovered from host rocks where they occur as veins of mineralisation, said bulk granular solids, bulk ores or recovered ores having been subjected to initial conditioning by primary crushing, said method comprising:

a conveyor for transporting said crushed ore with gradation of particles of said crushed ore between relatively fine fractions and relatively coarse fractions in a direction having a horizontal component and subjecting the crushed ore to vibration while being so transported to induce some separation of particles according to particle size, said conveyor causing said crushed ore to move as a granular flow outwardly and downwardly along a curved path through the air under the influence of gravity to further induce separation of particles according to particle size with at least a portion of said relatively fine fractions underflowing said relatively coarse fractions;

a splitter for dividing said granular flow moving along said curved path into at least two parts according to the trajectory of constituent particles, each of said at least two parts having different trajectories following splitting, and a surface plate presenting a surface to at least one of said two parts to flow downwardly along said surface under the influence of gravity, said surface being configured to allow the flow of said one of said two parts to spread laterally across the width of said surface, with particles in said one of said two parts travelling at different speeds according to particle size such that relatively coarser particles overflow relatively finer particles, thereby facilitating further gradation between relatively fine fractions and relatively coarse fractions, said surface being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface, whereby to induce separation of said granular particles according to particle size and removing unwanted material.

A belt conveyor may at least partly provide for transporting granular material in a direction having a horizontal component and subjecting the granular material to vibration while being so transported to induce some separation of particles according to particle size.

Further, a belt conveyor may at least partly provide for causing the granular material to subsequently move as a granular flow along a curved path under the influence of gravity.

The belt conveyor according to this aspect of the invention may have any one or more of the features of the belt conveyor specified above as used in the method according to the first aspect of the invention.

The splitter according to this aspect of the invention may at least partly provide for dividing the granular flow moving along the curved path into at least two parts according to their trajectory.

The splitter referred to above as part of the system according to this aspect of the invention may have any one or more of the features of the splitter specified above as used in the method according to other aspects of the invention.

The system may further comprise means defining a surface to which a stream of granular particles may each be presented to flow downwardly along the surface under the influence of gravity. The surface may be configured to allow the flow to spread laterally across the width of the surface, with particles travelling a different speeds according to particle size such that relatively coarser particles overflow relatively finer particles, thereby facilitating further gradation between relatively fine fractions and relatively coarse fractions.

The surface may be defined by a plate.

One of the parts may comprise unwanted material or such part may be subjected to further separation to remove unwanted material.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

The drawings shown are not necessarily to scale, with emphasis instead generally being placed upon illustrating the principles of the present disclosure.

The figures depict an embodiment exemplifying the principles of the present disclosure. The embodiment illustrates a certain configuration; however, it is to be appreciated that the inventive principles can be implemented by way of many different configurations, as would be obvious to a person skilled in the art, whilst still embodying any of the inventive principles. These configurations are to be considered within the embodiment described herein.

DESCRIPTION OF EMBODIMENT

In the following detailed description, the present invention is described in connection with a preferred embodiment. However, to the extent that the following description is specific to a particular embodiment or a particular use of the present techniques, it is intended to be illustrative only and merely provides a concise description of the exemplary embodiment. Accordingly, the present invention is not limited to the specific embodiment described below, but rather the invention includes all alternatives, modifications, and equivalents falling within the true scope of the appended claims.

Referring to the drawings, there is shown a system 10 for separating bulk material in the form of bulk granular solids. The system 10 is particularly suitable for processing bulk ores, such as iron ore and ores that are recovered from host rocks where they occur as veins of mineralisation, such as copper ores. Bulk ores such as iron ore have a characteristic of being typically harder, making such ores suitable for this type of processing.

While the system 10 may separate granular material into batches according to particle size, it is more concerned with enhancing ore grades by removing unwanted material rather than sizing material.

After being extracted and subjected to primary crushing, the ore is in the form of bulk granular solids comprising multiple sized fractions with gradation of the particles according to particle size between relatively fine fractions and relatively coarse fractions. It is the ore in that form which is intended to be processed by the system 10.

The system 10 comprises:
a) means 11 for transporting granular material the form of crushed ore (which is depicted schematically in the drawings and identified by reference numeral 12 and which comprises multiple sized fractions with gradation of the particles according to particle size between relatively fine fractions and relatively coarse fractions) in a direction having a horizontal component; and subjecting the granular material 12 to vibration while being so transported to induce some separation of particles according to particle size;
b) means 13 for causing the crushed ore 12 to subsequently move as a granular flow 14 outwardly and downwardly along a curved path 15 under the influence of gravity to further induce separation (i.e. gradation) of particles according to particle size; and
c) means 16 for dividing the granular flow 14 moving along the curved path 15 into different streams 17 according to their trajectory.

In the arrangement shown in the drawings, the granular flow 14 moving along curved path 15 is depicted schematically as a flow mass having several layers of gradation in the form of bands 18; for example, bands 18a, 18b and 18c. However, the gradation would not in reality be so distinct, as separation of particles within the granular flow 14 is not likely to be a precise gradation but rather a generally broad gradation, with some comingling of particles between the relatively fine fractions and relatively coarse fractions.

The means 11 comprises a conveyor 21 which in the arrangement shown is in the form of a belt conveyor. The belt conveyor 21 comprises an endless conveyor belt 23 passing around a head pulley 24 and a tail pulley (not shown). The endless conveyor belt 23 has an upper run 25 which defines a load-carrying run and which extends to a discharge end 27 of the belt conveyor 21 adjacent the head pulley 24. A hopper or other transfer (not shown) is provided for delivering crushed ore 12 onto the load-carrying upper run 25 of the belt conveyor 21. The crushed ore 12 is delivered onto the upper run 25 of the circulating endless conveyor belt 23, so forming a continuous layer of heaped granular material 29 which is transported generally horizontally to the discharge end 27 of the belt conveyor 21 during movement of the upper run 25.

As the layer of heaped granular material 29 is being transported generally horizontally to the discharge end 27 of the belt conveyor 21, it is subjected to some agitation created by movement of the endless conveyor belt 23 as it circulates around its endless path. More particularly, the endless conveyor belt 23 is inherently caused to vibrate as it circulates around its endless path, as a result of exposure to various forces, including intermittent forces arising as the circulating endless conveyor belt 23 rides over conveyor rollers and idlers, and also as a result of crushed ore 12 being deposited onto the endless conveyor belt 23 and subsequently discharged from the endless conveyor belt 23 at the discharge end 27 of the belt conveyor 21. The agitation to which the layer of heaped granular material 29 is subjected results in the relatively finer particles tending to fall between the relatively coarser particles, thereby inducing some initial separation (i.e. gradation) of particles according to particle size.

The means 13 for causing the crushed ore 12 to subsequently move as granular flow 14 along path 15 also comprises the belt conveyor 21, or more particularly the discharge end 27 of the belt conveyor. At the discharge end 27, crushed ore 12 is propelled from the circulating the endless conveyor belt 23 and moves as granular flow 14 through the air in a curved trajectory, further inducing separation (i.e. gradation) of particles according to particle size. The separation results in formation of bands 18a, 18b and 18c in the arrangement shown.

In practical terms, it is believed that the separation (i.e. gradation) occurs because of differences in effective friction between particles within the flow mass constituted by the granular flow 14. More particularly, smaller particles have a larger surface area for any given mass, and therefore logically have a higher effective friction given such forces have a direct proportional relationship to surface area. The differences in effective friction between particles leads to differential speeds between various particles, with smaller particles travelling at lower velocities than larger particles. As a consequence of the differential speeds, smaller particles underflow larger particles, with this characteristic being more pronounced when there are high levels of ultrafine particles or moisture present. This leads to a physical phenomenon in which there, at least to some extent, gradation of particles according to particle size within the granular flow.

In the arrangement shown, the upper run 25 of the belt conveyor 21 is inclined upwardly at discharge end 27. This arrangement serves to direct the discharging crushed ore 12 upwardly to some extent (as well as outwardly) to provide the flow mass (i.e. the granular flow 14), enhancing creation of the curved trajectory of the flow mass and thereby increasing the "air time" or "hang time" during which separation (i.e. gradation) can occur as smaller particles underflow larger particles.

The means 16 for dividing the granular flow 14 moving along the curved path 15 into different streams 17 according to their trajectory comprises a splitter system 31, with material having a lower trajectory being influenced in one direction by the splitter system and the remaining material being influenced in another direction.

In the arrangement shown, the splitter system 31 comprises a splitter 33 disposed to confront the oncoming the granular flow 14 (i.e. the flow mass). The splitter 33 is operable to divide the oncoming granular flow 14 into two stream portions 14a, 14b, of which lower stream portion 14a contains component material having a lower trajectory and upper stream portion 14b contains the remaining component material. The lower stream portion 14a underflows the splitter 33 and the upper stream portion 14b overflows the splitter. The two stream portions 14a, 14b represent the different streams 17 referred to above.

In the arrangement shown, the division of the granular flow 14 into two stream portions 14a, 14b is at the interface between bands 18a and 18b. With this arrangement, the lower stream 14a comprises particles in band 18a and the upper stream 14b comprises particles in bands 18b and 18c.

Figure 5:
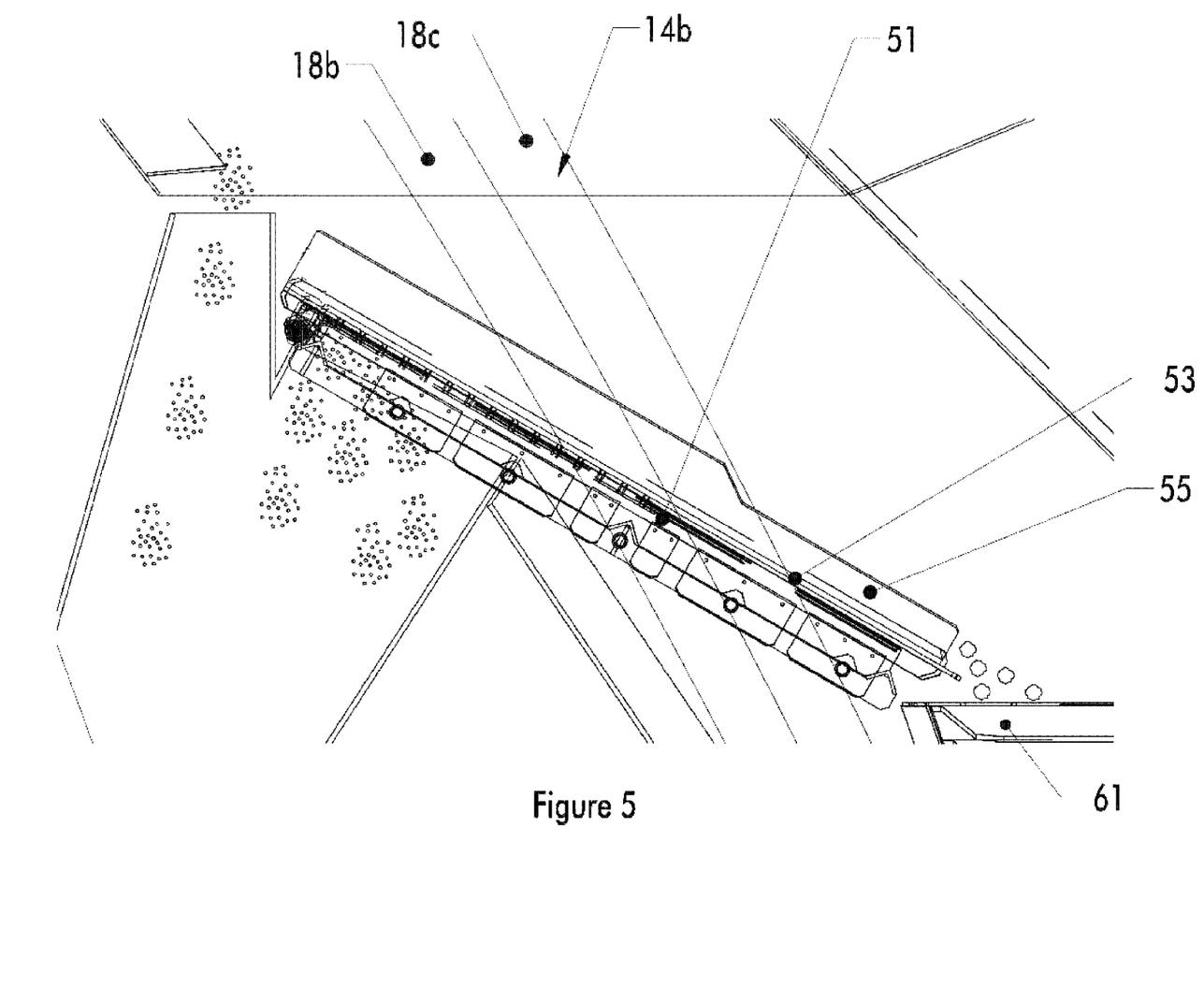
FIG. 5 is schematic elevational view of a lower section of the arrangement shown in FIG. 1.

In this embodiment, the splitter 33 comprises a body 35 presenting a leading edge 37 to oncoming granular flow 14 and two sides 39 extending from the leading edge 37 in the direction of flow. The two sides 39 comprise upper side 41 and lower side 42. The upper and lower sides 41, 42 diverge with respect to each other in the flow direction to divide the oncoming granular flow 14 into the two distinct stream portions 14a, 14b. Each side 41, 42 is configured (e.g. curved or profiled) to conform generally to the curved trajectory of path 15, so as to gently redirect the oncoming granular flow 14 into the two distinct stream portions 14a, 14b without creating a disturbance or turbulence which otherwise might adversely disturb the gradation of particles to the extent of causing re-mixing of particles within each of the stream portions 14a, 14b. This can be seen schematically in the drawings, with the overflowing stream portion 14b being shown as retaining the gradation depicted by bands 18b, 18c (as best seen in FIG. 5). The splitter system 31 effectively scalps particles in band 18a (e.g. unwanted fines) from the granular flow 14, leaving particles in bands 18b and 18c to continue as the flow mass.

As described above, the granular flow 14 is created by discharging granular material from the belt conveyor 21 to cause the discharging granular material to flow through the air in a curved trajectory. In other words, the discharging granular material constitutes the flow mass at that stage. Particles have different trajectories within the flow mass, according to particle size as previously explained. The trajectory can be calculated or ascertained empirically by a person skilled in the art, and the splitter system 31 configured and positioned accordingly.

It is preferable that no device (such as a deflector) be used to change the direction of the flow mass constituted by the discharging granular material. If any such device is to be used, it is preferably configured to provide little or no constraint to flow. If required, a suitable device may comprise a deflector presenting a curved deflector surface for guiding the flow, wherein the deflector surface is positioned relative to the flow to intercept the flow mass and cause it to move across the deflector surface as a sliding flow. The deflector surface may be so configured and disposed that angles at which the flow is intercepted are less than about 15 degrees (wherein the angles of intercept are applied to the flow at the point on the deflector surface at which the centre of the flow mass is intercepted). It is believed that a deflector surface having a large and constant radius of curvature would be desirable, typically with the radius being 3000 mm or more.

In this embodiment, the granular flow 14 is subjected to screening to remove oversize particles from the flow mass while it is moving along the curved path and prior to it being divided by the splitter system 31. The efficiency of any later gradation process may be enhanced by removing oversize particles at this stage.

Figure 1:
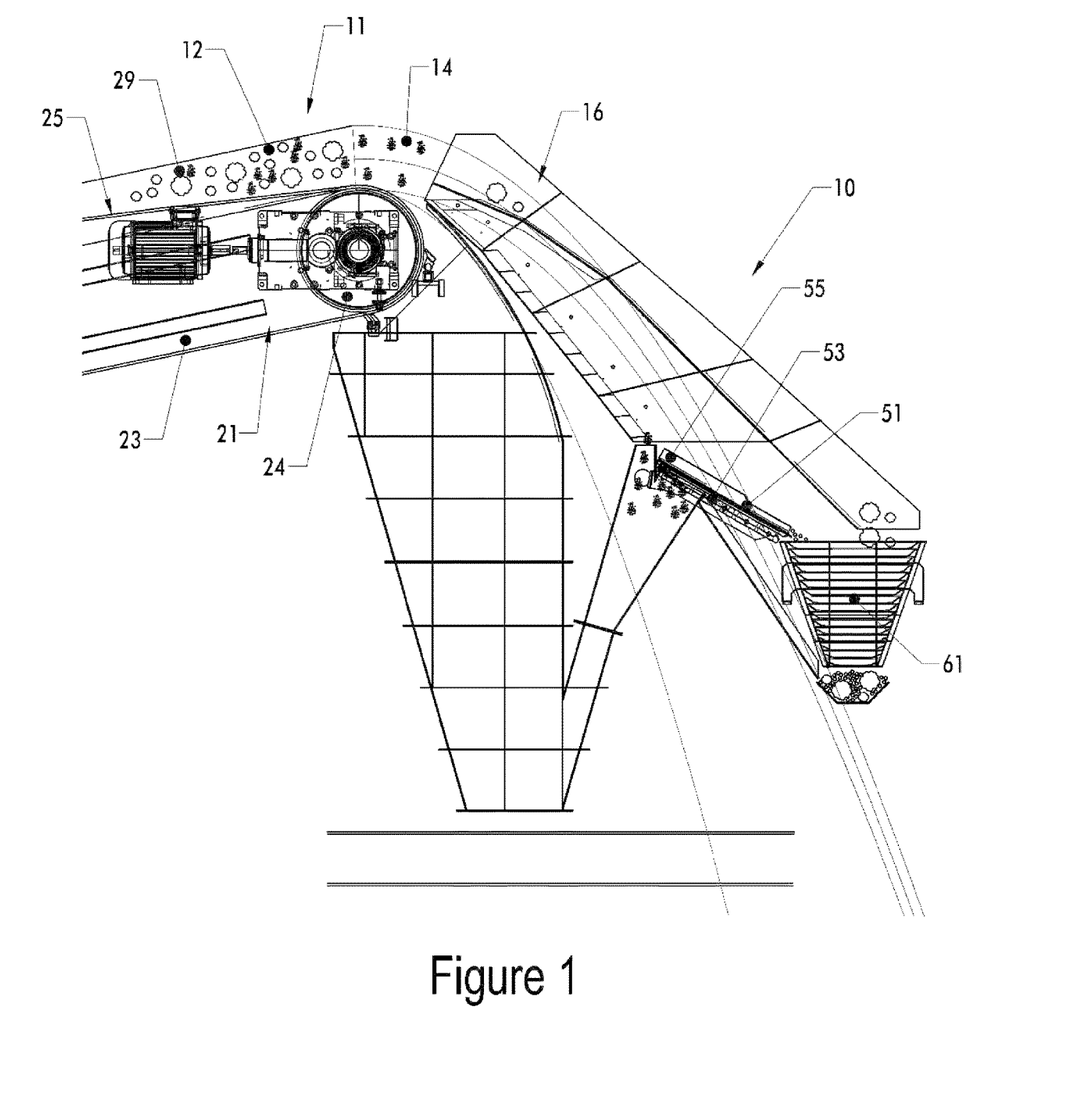
FIG. 1 is an elevational view of an embodiment of a separation system according to the invention.
Figure 2:
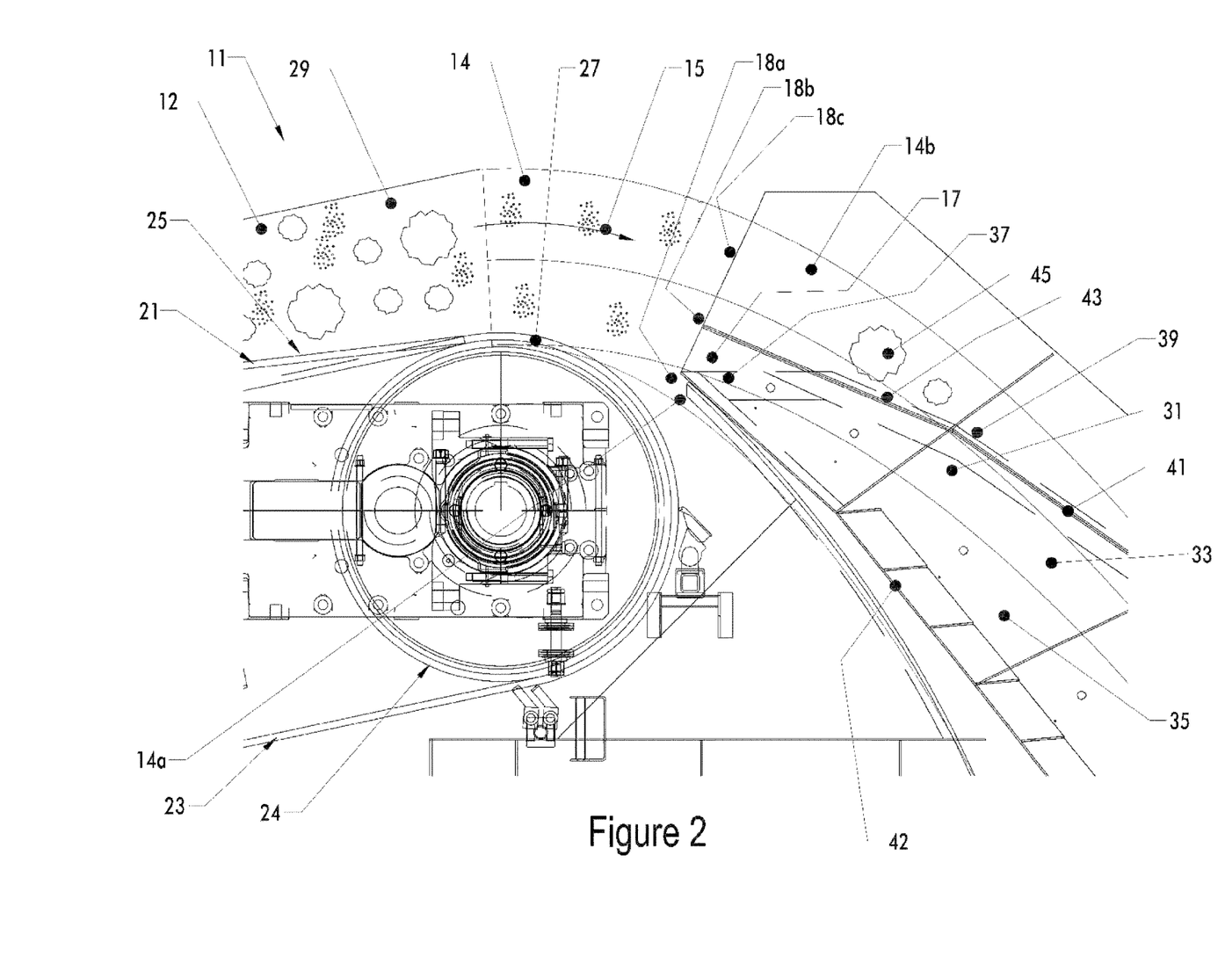
FIG. 2 is an elevational view of an upper section of the arrangement shown in FIG. 1.
Figure 3:
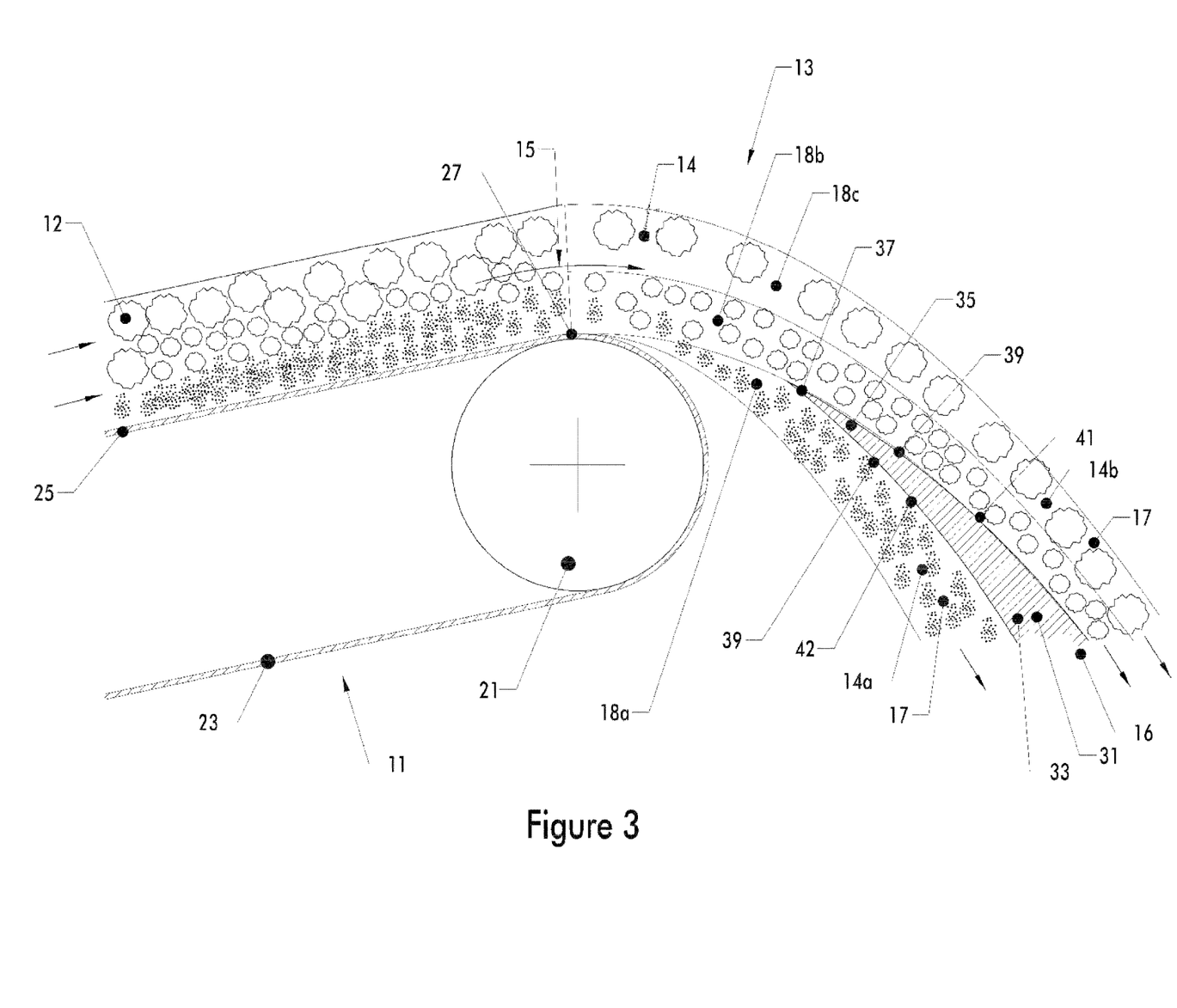
FIG. 3 is a view similar to FIG. 2, although presented in less detail and more schematically to illustrate certain parts of the upper section.
Figure 4:
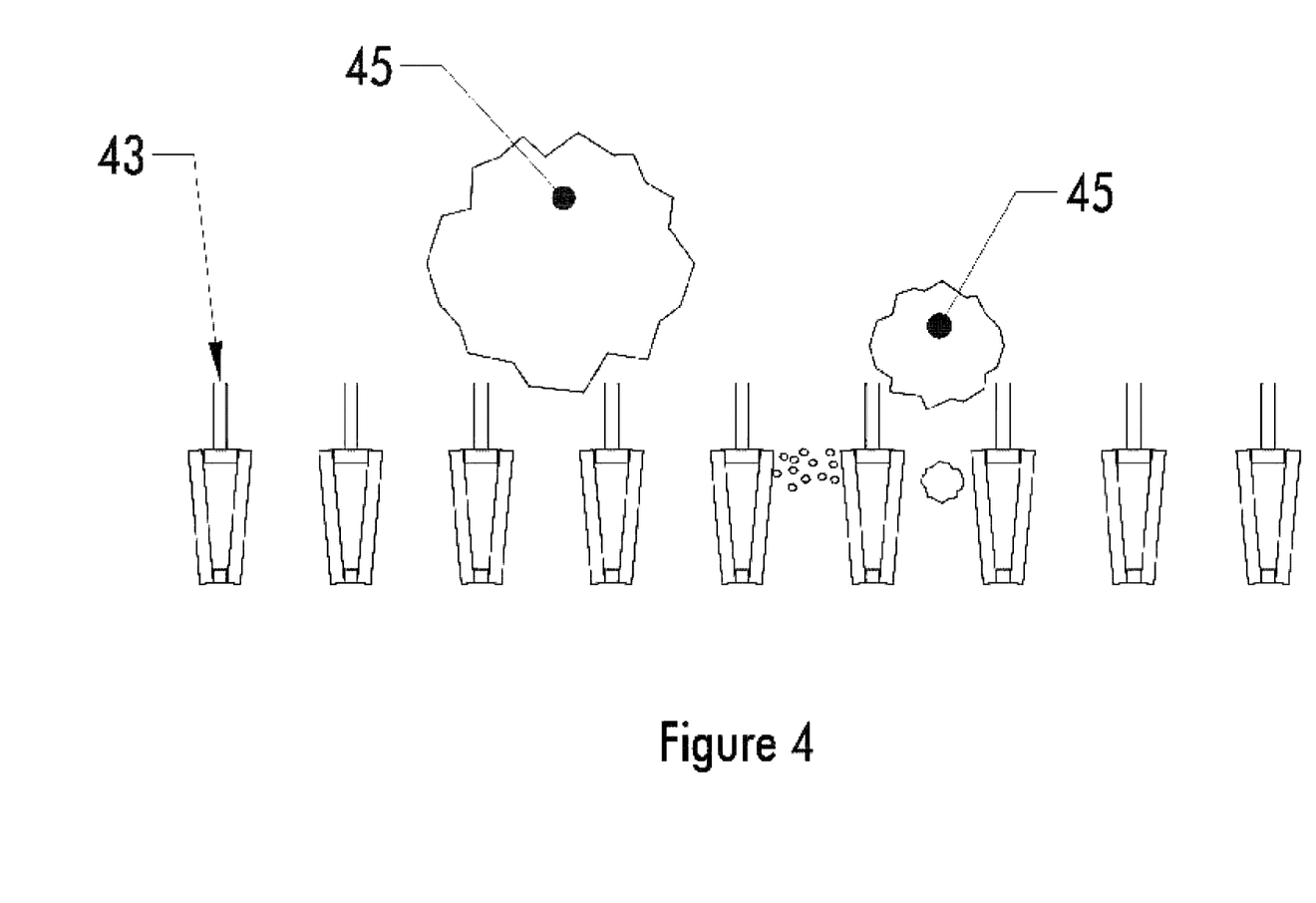
FIG. 4 is an elevational view of an optional screen for removing oversize particles, the screen being associated with the upper section shown in FIG. 2.

The screening may be performed by a screen 43 (as shown in FIG. 2) positioned along the curved path 15 between the discharge end 27 of the belt conveyor 21 and the splitter system 31. The screen 43 is configured to intercept oversize particles 45 within the granular flow while allowing other particles in the granular flow 14 to continue on towards the splitter system 31. The screen 43 is arranged so as not to create a disturbance or turbulence which otherwise might adversely disturb the gradation of particles within the granular flow 14 to the extent of causing re-mixing of particles. The screening is optional and may not necessarily be provided in other embodiments.

From the splitter system 31, the overflowing stream portion 14b (having bands 18b, 18c) is presented to a surface 51 to flow downwardly along the surface under the influence of gravity. The surface 51 is configured to allow the flow mass to spread laterally across the width of the surface, with particles travelling a different speeds according to particle size such that relatively coarser particles overflow relatively finer particles, thereby facilitating further gradation between relatively fine fractions and relatively coarse fractions. In the arrangement shown, the surface 51 is defined by a plate 53. A skirt or side wall 55 is provided at each vertical side of the plate 53.

The angle at which the surface 51 intercepts the stream 14b of granular particles is preferably selected to achieve flow downwardly across the surface as a sliding flow under the influence of gravity with little or no impact on the surface.

The surface 51 may be inclined at an angle just above a stall angle for the granular material (as described in WO 2014/026248, the content of which are incorporated herein by way of reference). Typically, the inclination of the surface 51 would be in the range of about 65 to 45 degrees from horizontal, dependent of course on the water content in the granular material.

Upon leaving the surface 51, the flow mass constituted by the stream portion 14b is further graduated, with smaller fractions generally below larger fractions. This can be beneficial for example circumstances where the flow mass is to be subjected to further screening, as is the case in this embodiment. Specifically, in this embodiment the flow mass is delivered to screen 61. Presenting the flow mass for screening as a granular flow with smaller fractions generally below larger fraction facilitates the screening process. For instance, gradation of granular particles between relatively fine fractions and relatively coarse fractions may potentially enhance screening effectiveness and/or screening efficiency.

In the embodiment described, the crushed ore 12 is preferably processed dry, although wet ore may also be processed. In some instances, it may be desirable to dry ores before processing, as moderately wet ores may have finer material also adhering to large lumps and thereby make separation more difficult. Alternatively, in certain circumstances it may be possible to add more water to wet ore to reduce adhesive forces.

From the foregoing, it is evident that the present embodiment provides a simple yet highly effective method and system for separating granular particles within granular material according to size, using flow characteristics of granular material along with characteristics of ores from which the granular particles are derived. The embodiment is particularly suitable for enhancing ore grades by removing unwanted material.

The method and system uses the influence of gravity to provide some initial separation (i.e. gradation) of particles according to size by transporting the granular material in direction having a horizontal component and subjecting the granular material to vibration while being so transported. The granular material is then moved as a granular flow along a curved path under the influence of gravity to further induce separation (i.e. gradation) of particles according to particle size. The flow mass is then divided into different streams according to the trajectory of the constituent particles.

In the embodiment described and illustrated, the flow mass is divided into two different streams according to the trajectory of the constituent particles. If no further separation is performed, this provides separation of the granular particles into two batches. If, on the other hand, further separation is performed (as is the case in the embodiment described and illustrated), the flow mass may ultimately be divided into three or more separate batches according to particulate size.

The foregoing disclosure is intended to explain how to fashion and use the particular embodiment described, rather than to limit the true, intended, and fair scope and spirit of the present disclosure. The foregoing description is not intended to be exhaustive, nor to be limited to the precise forms disclosed.

It should be appreciated that various modifications can be made without departing from the principles described herein. Therefore, the principles should be understood to include all such modifications within its scope.

The method steps, processes, and operations described herein are not to be construed as necessarily requiring their performance in the particular order discussed or illustrated, unless specifically identified as an order of performance. It is also to be understood that additional or alternative steps may be employed.

The terminology used herein is for the purpose of describing particular example embodiment only and is not intended to be limiting.

As used herein, the singular forms "a", "an" and "the" may be intended to include the plural forms as well, unless the context clearly indicates otherwise.

Reference to any positional descriptions, such as "top", "bottom" and "side", are to be taken in context of the embodiment described and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiment.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

Future patent applications maybe filed in Australia or overseas on the basis of, or claiming priority from, the present application. It is to be understood that the following claims are provided by way of example only, and are not intended to limit the scope of what may be claimed in any such future application. Features may be added to or omitted from the provisional claims at a later date so as to further define or re-define the invention or inventions.

The invention claimed is:

1. A method for separating granular particles comprising multiple sized fractions according to particle size, said granular particles being derived from bulk granular solids, bulk ores or ores recovered from host rocks where they occur as veins of mineralisation, said bulk granular solids, bulk ores or recovered ores having been subjected to initial conditioning by primary crushing said method comprising:

transporting granular material with gradation of the particles between relatively fine fractions and relatively coarse fractions in a direction having a horizontal component and subjecting said granular material to vibration while being so transported to induce some separation of particles according to particle size with at least a portion of said relatively fine fractions underflowing said relatively coarse fractions;

causing said granular material to move as a granular flow outwardly and downwardly along a curved path through the air under the influence of gravity to further induce separation of particles according to particle size;

dividing said granular flow moving along said curved path into at least two parts according to the trajectory of constituent particles; and presenting at least one of said two parts to a surface to flow downwardly along said surface under the influence of gravity, said surface being configured to allow the flow of said one of said two parts to spread laterally across the width of said surface, with particles in said one of said two parts travelling at different speeds according to particle size such that relatively coarser particles overflow relatively finer particles, thereby facilitating further gradation between relatively fine fractions and relatively coarse fractions, said surface being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface, whereby to induce separation of said granular particles according to particle size.

2. The method according to claim 1, wherein said flow is controlled such that separation of particles occurs without being disturbed by turbulence which could otherwise cause remixing of the separated particles.

3. The method according to claim 1, wherein said transport path is inclined upwardly to control the speed of said granular material on said transport path.

4. The method according to claim 1, wherein said surface is inclined downwardly.

5. The method according to claim 4, wherein the downward inclination of said surface is in the range of 65 to 45 degrees from horizontal.

6. The method according to claim 1, wherein said division of said granular flow moving along said curved path into at least two parts according to the trajectory of constituent particles comprises contacting said granular flow with a splitter, each of said at least two parts having different trajectories following splitting.

7. The method according to claim 6, wherein said splitter is positioned in the path of said granular flow such that a portion of said granular flow is caused to pass over said splitter and a portion of said granular flow is caused to pass under said splitter, whereby to separate the granular flow into plural streams, one of which overflows said splitter and the other of which underflovs said splitter.

8. The method according to claim 1, further comprising at least one screening step, and wherein at least one of said screening steps occurs prior to said granular flow being divided into at least two parts according to the trajectory of constituent particles.

9. The method according to claim 8, wherein at least one of said screening steps occurs following said lateral spread of said one of said two parts across the width of said surface.

10. The method according to claim 1, wherein said adopted stall angle is selected to be the stall angle of constituent particles of said one of said two parts.

11. A system for separating granular particles according to particle size, said granular particles being derived from bulk granular solids, bulk ores or ores recovered from host rocks where they occur as veins of mineralisation, said bulk granular solids, bulk ores or recovered ores having been subjected to initial conditioning by primary crushing, said system comprising:
 a conveyor for transporting granular material comprising multiple sized fractions with gradation of particles in said granular material according to particle size between relatively fine fractions and relatively coarse fractions in a direction having a horizontal component and subjecting said granular material to vibration while being so transported to induce some separation of particles according to particle size, with a portion of said relatively fine fractions underflowing said relatively coarse fractions, said conveyor causing said granular material to subsequently move as a granular flow outwardly and downwardly along a curved path through the air under the influence of gravity to further induce separation of particles according to particle size;
 a separator for dividing said granular flow moving along the curved path into at least two parts according to the trajectory of constituent particles, and
 a surface plate presenting a surface to at least one of said two parts to flow downwardly along said surface plate under the influence of gravity, said surface plate being configured to allow the flow of said one of said two parts to spread laterally across the width of said surface plate, with particles travelling at different speeds according to particle size such that relatively coarser particles overflow relatively finer particles, thereby facilitating further gradation between relatively fine fractions and relatively coarse fractions, said surface plate being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface plate, whereby to induce separation of said granular particles according to particle size.

12. The system according to claim 11, wherein said flow is controlled such that separation of particles occurs without being disturbed by turbulence which could otherwise cause remixing of the separated particles.

13. The system according to claim 11, wherein said transport path is inclined upwardly to control the speed of said granular material on said transport path.

14. The system according to claim 11, wherein said conveyor has a discharge end from which said granular material is propelled through the air in said curved trajectory under said influence of gravity.

15. The system according to claim 11, wherein said surface plate is inclined downwardly.

16. The system according to claim 15, wherein the inclination of said surface plate is in the range of 65 to 45 degrees from horizontal.

17. The system according to claim 11, wherein said separator for dividing said granular flow moving along said curved path into at least two parts according to the trajectory of constituent particles comprises a splitter which contacts said granular flow, each of said at least two parts having different trajectories following division by said splitter.

18. The system according to claim 17, wherein said splitter comprises a splitter body presenting a leading edge to said granular flow and two sides extending from said leading edge in the direction of said granular flow.

19. The system according to claim 18, wherein said two sides comprise upper and lower sides which diverge with respect to each other in the direction of said flow path whereby to divide said granular material into at least two parts according to the trajectory of constituent particles.

20. The system according to claim 19, wherein each of said sides is configured to conform generally to said curved trajectory to redirect said granular flow into said at least two parts without creating disturbance by turbulence which otherwise might adversely disturb the gradation of particles to the extent of causing remixing of separated particles.

21. The system according to claim 11, further comprising one or more screens.

22. The system according to claim 21, wherein said at least one of said screens is positioned in said granular flow path prior to being divided into at least two parts according to the trajectory of constituent particles.

23. The system according to claim 21, wherein said at least one of said screens is positioned in said flow path of said one of said two parts following said lateral spread of said one of said two parts across the width of said surface plate.

24. A method for enhancing ore grades by removing unwanted material from bulk granular solids, bulk ores or ores recovered from host rocks where they occur as veins of mineralisation, said bulk granular solids, bulk ores or recovered ores having been subjected to initial conditioning by primary crushing, said method comprising:
 transporting said crushed ore with gradation of particles of said crushed ore between relatively fine fractions and relatively coarse fractions in a direction having a horizontal component and subjecting said crushed ore to vibration, while being so transported to induce some separation of particles according to particle size;
 causing said crushed ore to move as a granular flow outwardly and downwardly along a curved path through the air under the influence of gravity to further induce separation of particles according to particle size with at least a portion of said relatively fine fractions underflowing said relatively coarse fractions;
 dividing said granular flow moving along the curved path into at least two parts according to the trajectory of constituent particles, and
 presenting at least one of said two parts to a surface to flow downwardly along said surface under the influence of gravity, said surface being configured to allow the flow of said one of said two parts to spread laterally across the width of said surface, with particles in said one of said two parts travelling at different speeds according to particle size such that relatively coarser particles overflow relatively finer particles, thereby facilitating further gradation between relatively fine fractions and relatively coarse fractions, said surface being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface, whereby to induce separation of said granular particles according to particle size and removing unwanted material.

25. The method according to claim 24, wherein said flow is controlled such that separation of particles occurs without being disturbed by turbulence which could otherwise cause remixing of the separated particles.

26. The method according to claim 24, wherein said transport path is inclined upwardly at or adjacent to an exit point for said granular material to control the speed of said granular material on said transport path.

27. The method according to claim 24, wherein said surface is inclined downwardly.

28. The method according to claim 27, wherein the inclination of said surface is in the range of 65 to 45 degrees from horizontal.

29. The method according to claim 24, wherein said division of said granular flow moving along said curved path into at least two parts according to the trajectory of constituent particles comprises contacting said granular flow with a splitter, each of said at least two parts having different trajectories following splitting.

30. The method according to claim 29, wherein said splitter is positioned in the path of said granular flow such that a portion of said granular flow is caused to pass over said splitter and a portion of said granular flow is caused to pass under said splitter, whereby to separate the granular flow into plural streams, one of which overflows said splitter and the other of which underflows said splitter.

31. The method according to claim 24, further comprising at least one screening step, and wherein said at least one of said screening steps occurs prior to being divided into at least two parts according to the trajectory of constituent particles.

32. The method according to claim 31, wherein said at least one of said screening steps occurs following said lateral spread of said one of said two parts across the width of said surface.

33. The method according to claim 24, wherein said adopted stall angle is selected to be the stall angle of constituent particles of said one of said two parts.

34. A system for enhancing ore grades by removing unwanted material from bulk granular solids, bulk ores or ores recovered from host rocks where they occur as veins of mineralisation, said bulk granular solids, bulk ores or recovered ores having been subjected to initial conditioning by primary crushing, said system comprising;

a conveyor for transporting said crushed ore with gradation of particles of said crushed ore between relatively fine fractions and relatively coarse fractions in a direction having a horizontal component and subjecting the crushed ore to vibration while being so transported to induce some separation of particles according to particle size, said conveyor causing said crushed ore to move as a granular flow outwardly and downwardly along a curved path through the air under the influence of gravity to further induce separation of particles according to particle size with at least a portion of said relatively fine fractions underflowing said relatively coarse fractions;

a splitter for dividing said granular flow moving along said curved path into at least two parts according to the trajectory of constituent particles, each of said at least two parts having different trajectories following splitting, and a surface plate presenting a surface to at least one of said two parts to flow downwardly along said surface under the influence of gravity, said surface being configured to allow the flow of said one of said two parts to spread laterally across the width of said surface, with particles in said one of said two parts travelling at different speeds according to particle size such that relatively coarser particles overflow relatively finer particles, thereby facilitating further gradation between relatively fine fractions and relatively coarse fractions, said surface being inclined at an angle to the flow path of said one of said two parts, said angle being selected to be inclined at an angle just above an adopted stall angle for said granular flow thereby permitting constituent particles of said one of said two parts to continue to flow, the flow of particles in said one of said two parts being adjusted by reason of differences in effective friction between said particles in said one of said two parts which leads to differential speeds between particles in said one of said two parts with finer particles in said one of said two parts underflowing larger particles and facilitating said lateral spread of said one of said two parts across the width of said surface, whereby to induce separation of said granular particles according to particle size and removing unwanted material.

35. The system according to claim 34, wherein said flow is controlled such that separation of particles occurs without being disturbed by turbulence which could otherwise cause remixing of the separated particles.

36. The system according to claim 34, wherein said surface of said surface plate is inclined downwardly.

37. The system according to claim 36, wherein the inclination of said surface plate surface is in the range of 65 to 45 degrees from horizontal.

38. The system according to claim 34, wherein said conveyor is upwardly inclined at or adjacent to an exit point for said granular material to control the speed of said granular material.

39. The system according to claim 34, wherein said splitter is positioned in the path of the granular flow such that a portion of said granular flow is caused to pass over said splitter and a portion of said granular flow is caused to pass under the splitter, whereby to separate the granular flow into plural streams, one of which overflows said splitter and the other of which underflows said splitter.

40. The system according to claim 34, further comprising one or more screens.

41. The system according to claim 40, wherein said at least one of said screens is positioned in, said flow path prior to being divided into at least two parts according to the trajectory of constituent particles.

42. The system according to claim 40, wherein said at least one of said screens is positioned in said flow path following said lateral spread of said one of said two parts across the width of said surface plate.

43. The system according to claim 34, wherein said granular flow is subjected to a treatment while moving along said curved path to remove certain components before being divided into said at least two parts according to their trajectory.

44. The system according to claim 34, wherein said adopted stall angle is selected to be the stall angle of constituent particles of said one of said two parts.

* * * * *